United States Patent
Spadaro et al.

(10) Patent No.: US 9,319,317 B1
(45) Date of Patent: Apr. 19, 2016

(54) SYSTEMS AND METHODS FOR DISSEMINATING ADDRESSES IN DISTRIBUTED SWITCHING ENVIRONMENTS

(71) Applicants: Derek Martin Spadaro, Huntsville, AL (US); Mark Christian Rudolph, Madison, AL (US); Timothy James Schlichter, Huntsville, AL (US)

(72) Inventors: Derek Martin Spadaro, Huntsville, AL (US); Mark Christian Rudolph, Madison, AL (US); Timothy James Schlichter, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 113 days.

(21) Appl. No.: 14/170,055

(22) Filed: Jan. 31, 2014

(51) Int. Cl.
*H04L 12/28* (2006.01)
*H04L 12/741* (2013.01)

(52) U.S. Cl.
CPC .................................. *H04L 45/745* (2013.01)

(58) Field of Classification Search
USPC ................. 370/250–254, 389–392, 401–455; 709/229–238
See application file for complete search history.

(56) References Cited

U.S. PATENT DOCUMENTS

| | | | |
|---|---|---|---|
| 6,424,650 B1* | 7/2002 | Yang et al. | 370/390 |
| 6,735,198 B1* | 5/2004 | Edsall et al. | 370/389 |
| 7,535,827 B2* | 5/2009 | Rusmisel et al. | 370/219 |
| 8,259,726 B2* | 9/2012 | Subramanian et al. | 370/392 |
| 8,266,216 B2* | 9/2012 | Rusitschka et al. | 709/206 |
| 8,300,523 B2* | 10/2012 | Salam et al. | 370/220 |
| 8,654,680 B2* | 2/2014 | Subramanian et al. | 370/255 |
| 8,908,527 B2* | 12/2014 | Boutros et al. | 370/236 |
| 2005/0165885 A1* | 7/2005 | Wong | 709/201 |
| 2007/0076709 A1* | 4/2007 | Mattson et al. | 370/389 |
| 2008/0240106 A1 | 10/2008 | Schlenk | |

* cited by examiner

*Primary Examiner* — Man Phan
(74) *Attorney, Agent, or Firm* — Maynard Cooper & Gale, P.C.; Jon E. Holland

(57) ABSTRACT

In a distributed switching environment, a plurality of switches are clustered together to form a stack, and it is generally desirable for forwarding tables, such as MAC tables, to be synchronized so that their mappings are consistent. When a switch receives a packet having a source address (e.g., MAC address) that is unknown, the switch is configured to disseminate the source address to the other switches of the stack. Rather than using software protocols to disseminate the source address, the switch instead transmits a multicast packet that (1) includes the unknown source address and (2) spoofs the other switches into believing that the packet was received on the same port from which the unknown source address was received on ingress to the stack. Thus, the other switches learn the unknown source address in hardware without having to rely on software for updating their forwarding tables.

21 Claims, 6 Drawing Sheets

SYSTEMS AND METHODS FOR DISSEMINATING ADDRESSES IN DISTRIBUTED SWITCHING ENVIRONMENTS

RELATED ART

In a distributed switching environment, a plurality of independent network switches are clustered together in an arrangement, sometimes referred to as a "switch stack" or "stack," in which the multiple switches function like a single switch. Often each switch of the stack is purchased from the same vendor allowing the switches to pass vendor-specific information in order to facilitate management, control, and operation of the stacked switches.

Each switch has sets of forwarding tables, such as a media access control (MAC) table, that are used to make forwarding decisions for packets that are received by the switch. A given switch typically processes packets from a large number of sources, and it is usually not feasible to provision its MAC table with all of the MAC addresses that the switch is likely to encounter. Thus, the mappings in the MAC table are dynamically learned during operation.

In a distributed switching environment, it is desirable for certain forwarding tables, such as media access control (MAC) tables, to be synchronized. That is, it is desirable for the forwarding tables to have the same mappings so that a complete path through the stack is ensured for each learned MAC address. Accordingly, when a packet having an unknown source MAC address is received by the stack, the switch that receives the packet typically invokes a table synchronization operation in which the switch disseminates the MAC address to the other switches of the stack using a control channel implemented through software protocols. In response, the other switches update their MAC tables to include the new MAC address so that the MAC-table mappings are consistent from switch-to-switch.

Each switch is configured to process a large number of packets, and it is desirable for the operation of a switch to be optimized in an effort to reduce delays and increase performance. Low cost techniques for improving the speed at which the switches process packets are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for disseminating addresses in distributed switching environments, thereby permitting synchronization of forwarding tables within such environments. In an embodiment of a distributed switching environment, a plurality of switches are clustered together to form a stack, and it is generally desirable for forwarding tables, such as MAC tables, to be synchronized so that their mappings are consistent. When a switch within the stack receives a packet having a source address (e.g., MAC address) that is unknown, the switch is configured to disseminate the source address to the other switches of the stack. Rather than using software protocols to disseminate the network address, the switch instead transmits a multicast message that (1) includes the unknown source address and (2) spoofs the other switches into determining that the message was received via the same ingress port from which the unknown source address was received on ingress to the stack. Thus, the other switches learn the unknown source address in hardware without having to rely on software for updating their forwarding tables. As a result, the unknown source address is disseminated to and learned by the other switches of the stack much quicker than would otherwise be possible using software protocols.

Figure 1:
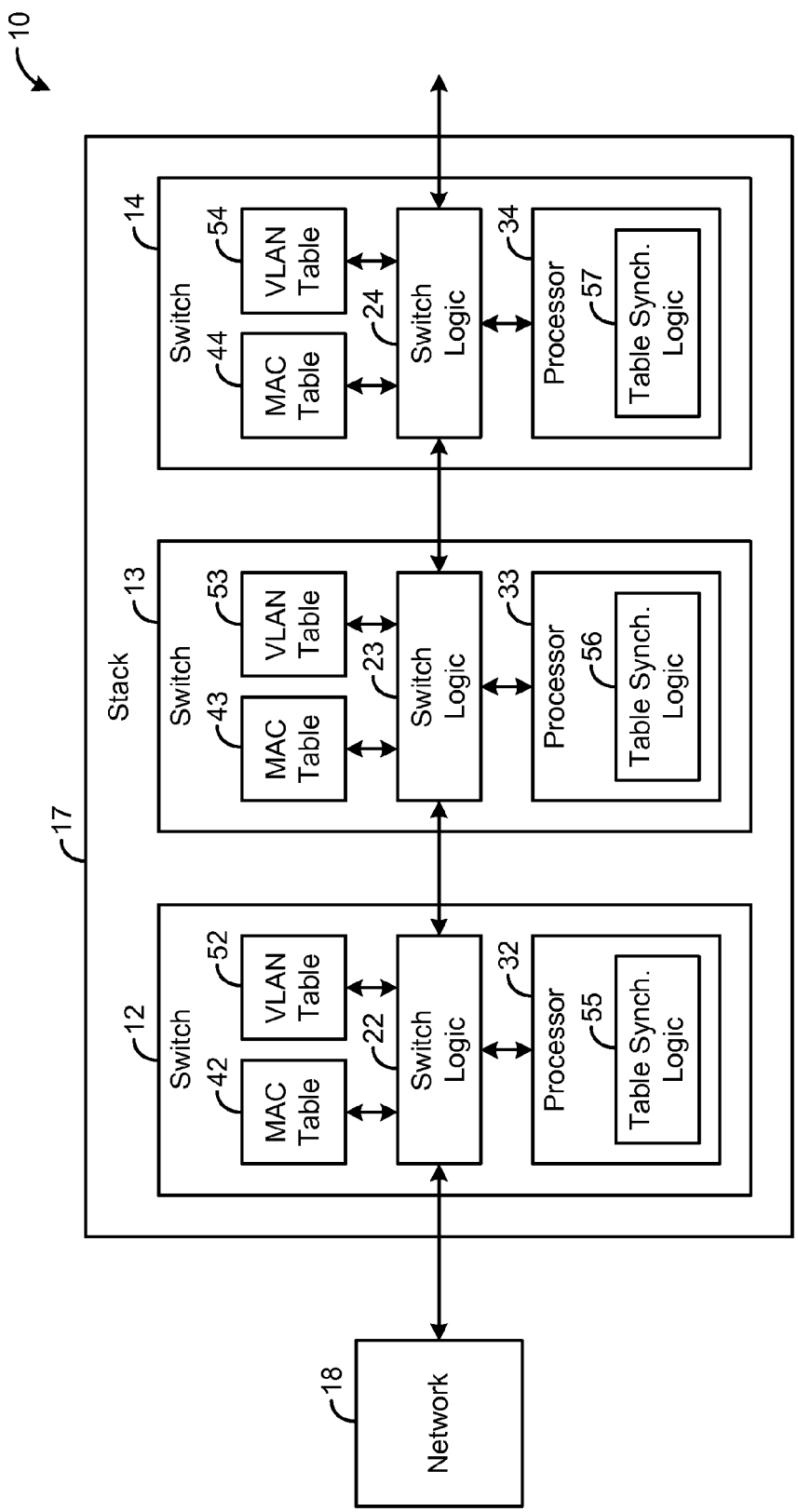
FIG. 1 is a block diagram illustrating a conventional communication system having a plurality of network switches that are clustered into a stack.

FIG. 1 depicts a conventional communication system 10 having a plurality of network switches 12-14 that are clustered into an arrangement 17, commonly referred to as a "stack," in which the multiple switches 12-14 function like a single switch. Note that the switches 12-14 are shown connected in series in FIG. 1, but other arrangements of the cluster of switches 12-14 are possible. The stack 17, also referred to herein as "switch stack," is configured to communicate data packets with a network 18. As an example, the stack 17 may receive packets from the network 18 and forward the packets to other elements (e.g., switches) of the same network 18, elements of a different network (not shown), or customer premises equipment (CPE). For illustrative purposes, it will be assumed hereafter that packets are communicated according to Ethernet protocols, but other types of protocols are possible in other embodiments.

As shown by FIG. 1, each switch 12-14 has respective switch logic 22-24 and a respective processor 32-34. Each switch 12-14 also has various forwarding tables, such as a respective MAC table 42-44 and a respective VLAN table 52-54, as shown by FIG. 1. The switch logic 22-24 are typically implemented in hardware, such as field programmable gate arrays (FPGAs), and the processors 32-34 execute software or firmware for performing various functions, as will be described in more detail hereafter. In addition, if desired, it is possible to implement at least some of the functions of the switch logic 22-24 in software or firmware.

The switches 12-14 may be configured to implement and process packets from at least one virtual local area network (VLAN) in accordance with Ethernet protocols. Note that there are generally three types of packets communicated by the conventional communication system 10 of FIG. 1: broadcast, multicast, and unicast. A broadcast packet is generally transmitted from a source to all destinations of a VLAN. A multicast packet is generally transmitted from a source to a group of destinations, and a unicast packet is transmitted from a source to a destination having an address that is specified in the unicast packet. The packet's type is typically indicated by one or more fields (e.g., destination MAC address) in the packet's header.

In general, when a switch 12-14 receives a broadcast or multicast packet carried by a VLAN, the switch 12-14 forwards the packet based on its VLAN table. In particular, the switch 12-14 forwards a broadcast or multicast packet to all of its ports (not shown in FIG. 1) that are members of the VLAN, as indicated by its VLAN table, except for the port that received the packet on ingress to the switch 12-14. In some cases, a multicast group is recognizable via a destination address in a multicast packet, which may be referred to as a "known" multicast message in this example. In such case, the multicast packet is forwarded to the port or ports that are members of the multicast group without flooding the packet to all of the members of the VLAN that is identified within the multicast message.

For a unicast packet, a switch 12-14 forwards the packet only to the port or ports mapped by its MAC table to the packet's destination MAC address or other information in the packet's header. In this regard, the MAC table has a plurality of entries in which each entry defines a mapping for associating at least a MAC address with a port identifier. Each entry comprises a MAC address and at least one port identifier that uniquely identifies a port of the stack 17 thereby mapping such port to the MAC address in the same entry. The entry may also comprise one or more VLAN tags on which forwarding decisions can be made. Thus, if a particular resource communicates via four different VLANs, then the resource's MAC address may be included in at least four entries of the switch's MAC table in which each entry comprises a respective VLAN tag.

When a switch 12-14 receives a unicast packet, the switch 12-14 searches for an entry corresponding to the packet's destination MAC address and VLAN tag, assuming that the packet has a VLAN tag. If the switch 12-14 finds an entry having the packet's destination MAC address and VLAN tag, the switch 12-14 forwards the packet to the port or ports identified by such entry. In this regard, the switch 12-14 uses the destination MAC address and the VLAN tag of the packet as keys to lookup in its MAC table the port identifier or identifiers correlated with (e.g., in the same entry as) the packet's destination MAC address and VLAN tag. When the switch 12-14 finds a MAC-table entry corresponding to the destination MAC address of the received unicast packet (i.e., when there is a MAC table hit), the unicast packet is referred to as a "known" unicast packet.

If the MAC table does not have an entry corresponding to the destination MAC address of a received unicast packet (i.e., if there is a MAC table miss), then the unicast packet is referred to as an "unknown" unicast packet. The switch 12-14 is configured to forward an unknown unicast packet like a broadcast or multicast packet. That is, the switch 12-14 forwards an unknown unicast packet carried by a VLAN to all of the ports that are members of the VLAN, as indicated by its VLAN table, except for the port that received the packet on ingress to the switch 12-14.

Figure 2:
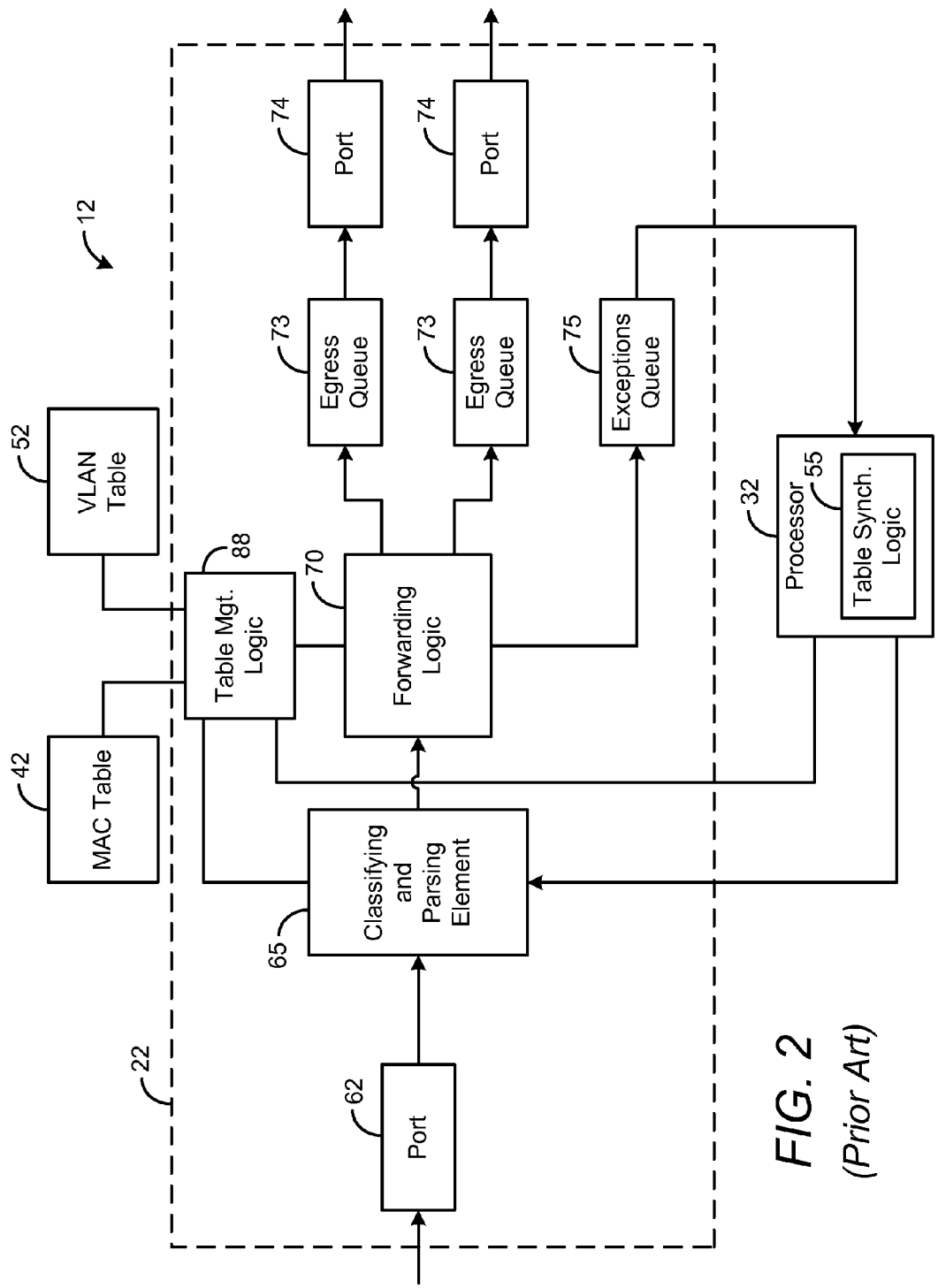
FIG. 2 is a block diagram illustrating a conventional network switch.

FIG. 2 depicts a conventional switch 12. Note that the other switches 13 and 14 may be configured identical or similar to the switch 12 shown by FIG. 2. Data traffic is received via one or more ports 62. Each received packet is parsed and classified by a classifying and parsing element 65 to determine metadata indicative of various attributes of the packet, such as MAC addresses, VLAN tags, message type, and a port identifier for the port 62 that received the packet on ingress to the switch 12. For example, the element 65 may determine metadata indicating the destination and/or source MAC address of the packet and whether the packet is a unicast, multicast, or broadcast packet. For packets carried by VLANs, sometimes referred to as "VLAN packets," the metadata typically includes at least one VLAN tag for the packet.

Upon receiving a VLAN packet, the classifying and parsing element 65 requests table management logic 88 to search the MAC table 42 for an entry corresponding to the packet using the packet's metadata, as described above. If there is such a corresponding entry resulting in a MAC table hit, the forwarding logic 70 forwards the packet to one or more egress queues 73 to await transmission from output ports 74, as appropriate, assuming that there are no exceptions as will be described in more detail hereafter. If there is no corresponding entry in the MAC table 42, thereby resulting in a MAC table miss for the packet's destination MAC address, the forwarding logic 70 is configured to flood the packet to all ports that are members of the packet's VLAN.

The classifying and parsing element 65 also requests that the table management logic 88 search the MAC table 42 for an entry having a MAC address and VLAN tag respectively matching the source MAC address and VLAN tag, if any, of the packet. If there is no corresponding entry in the MAC table 42 resulting in a MAC table miss for the packet's source MAC address, the table management logic 88 adds the packet's source MAC address to the MAC table 42. That is, the table management logic 88 learns the packet's source MAC address by storing the source MAC address in an available entry of the MAC table 42 and correlating this address with (1) the port identifier identifying the port 62 that received the packet on ingress to the stack 17 and (2) the packet's VLAN identifier, if the packet has a VLAN identifier. Note that in a stack 17, a port is identified by its local port identifier as well as an identifier, referred to as a "unit identifier," that identifies the switch in which the port resides.

At least some packets are trapped by the classifying and parsing element 65 and the forwarding logic 70 so that their metadata are transmitted to an exceptions queue 75 to await processing by a processor 32. Note that there are a variety of reasons why a packet may be trapped for processing by the processor 32. As an example, a packet may be trapped when its source MAC address is learned by the switch so that the processor 32 may initiate a table synchronization operation for synchronizing the MAC tables 42-44 based on the learned MAC address, as will be described in more detail below.

In this regard, when the packet's metadata is received by the processor 32, the table synchronization logic 55 (which is implemented in software or firmware) is invoked and processes the metadata in order to disseminate the source MAC address of the trapped packet to the other switches 13 and 14 of the stack 17 so that these switches also learn the source MAC address. In particular, the table synchronization logic 55 transmits a control packet to the classifying and parsing element 65, which inserts the control packet into the switch's packet flow. This control packet includes the source MAC address of the trapped data packet, the port identifier (both the local port identifier and the unit identifier) identifying the port 62 that received the trapped data packet on ingress to the stack 17, and the VLAN tag or tags of the trapped data packet, if the trapped data packet has any such VLAN tags.

The switches 13 and 14 are configured to trap this control packet so that it is sent to the processors 33 and 34 of the switches 13 and 14, respectively. In response to the control packet, each processor 33 and 34 invokes a respective set of table synchronization logic 56 and 57 to handle the trapped control packet by adding the source MAC address to the switch's MAC table. In this manner, when any one switch 12-14 receives a data packet having an unknown source MAC address, all of the MAC tables 42-44 are updated to learn this source MAC address such that the MAC tables 42-44 remain synchronized over time. That is, each MAC table 42-44 has the same mappings as the other MAC tables in the stack 17.

Unfortunately, the synchronization operation initiated by the switch 12 typically takes a relatively long time to complete. In this regard, there are delays associated with trapping the control packet in downstream switches 13 and 14 and invoking software or firmware by the processors 33 and 34 to handle the control packet. Further, at times, there may be a relatively high number of packets being trapped by a given switch resulting in additional processing delays.

In various exemplary embodiments of the present disclosure, such processing delays are avoided by spoofing the downstream switches to perform the table synchronization operation in hardware instead of software, as will be described in more detail below, so that the overall time required to complete a table synchronization operation is significantly reduced.

Figure 3:
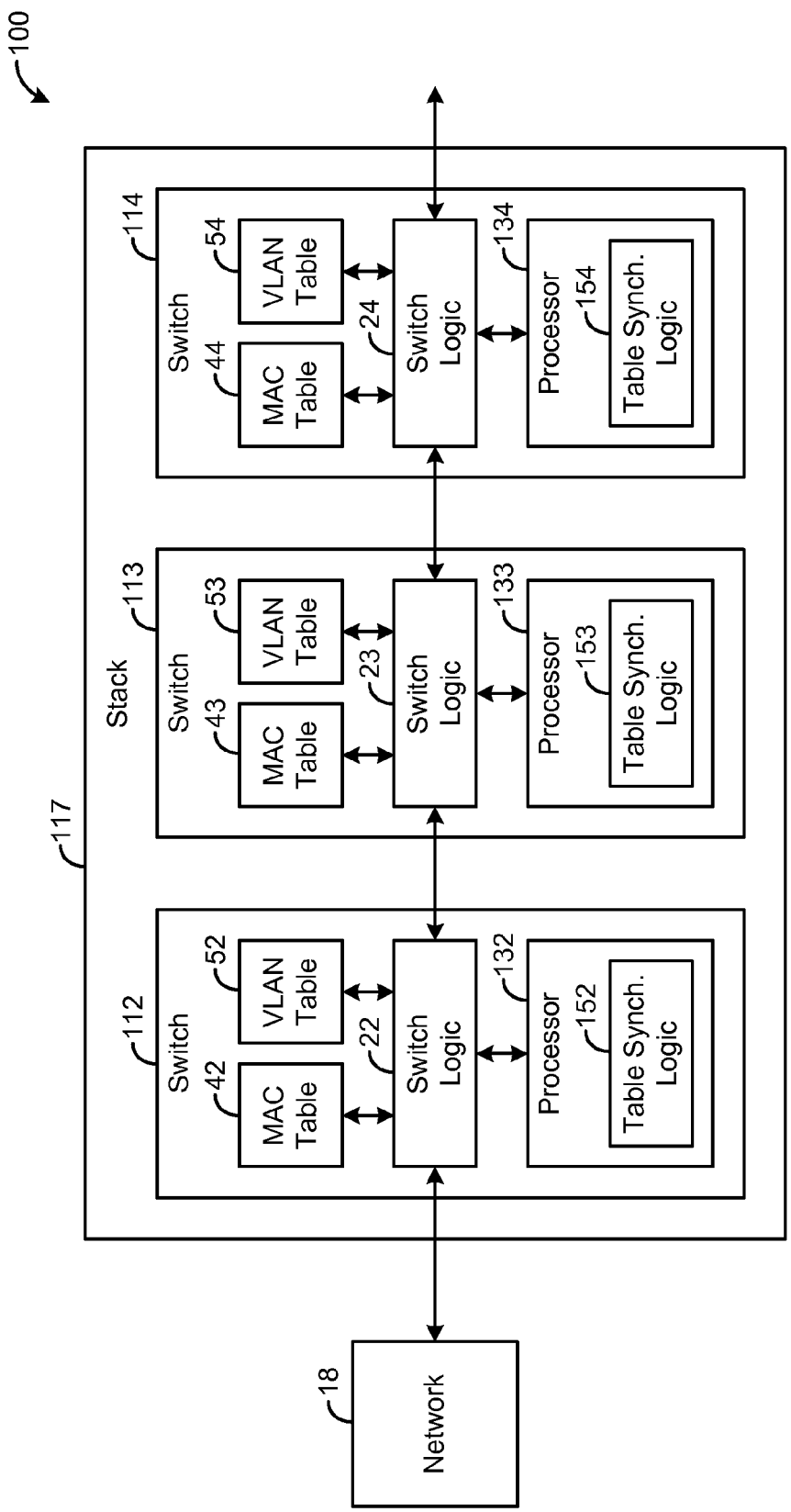
FIG. 3 is a block diagram illustrating an exemplary embodiment of a communication system having a plurality of network switches that are clustered into a stack.

FIG. 3 depicts an exemplary embodiment of a communication system 100 having a plurality of switches 112-114 that are clustered to form an exemplary stack 117, similar to the conventional stack 17 shown by FIG. 1. For illustrative purposes, it will be assumed hereafter that the switches 112-114 of the stack 117, also referred to herein as "switch stack," are configured the same and operate the same as the conventional switches 12-14 of FIG. 1, respectively, except as otherwise described hereafter. In this regard, the stack 117 receives and forwards network traffic from the network 18, and the switches 112-114 have switch logic 22-24, respectively, that may be identical to the conventional switch logic 22-24 shown by FIG. 1, as can be seen by comparing FIGS. 2 and 4. As indicated above, the switch logic 22-24 are implemented in hardware, though it is possible for at least some functions of the switch logic 22-24 to be implemented in software or firmware, if desired. Further, the switches 112-114 include processors 132-134 for handling exceptions and performing other functions similar to the processors 32-34 depicted by FIG. 1.

Figure 5:
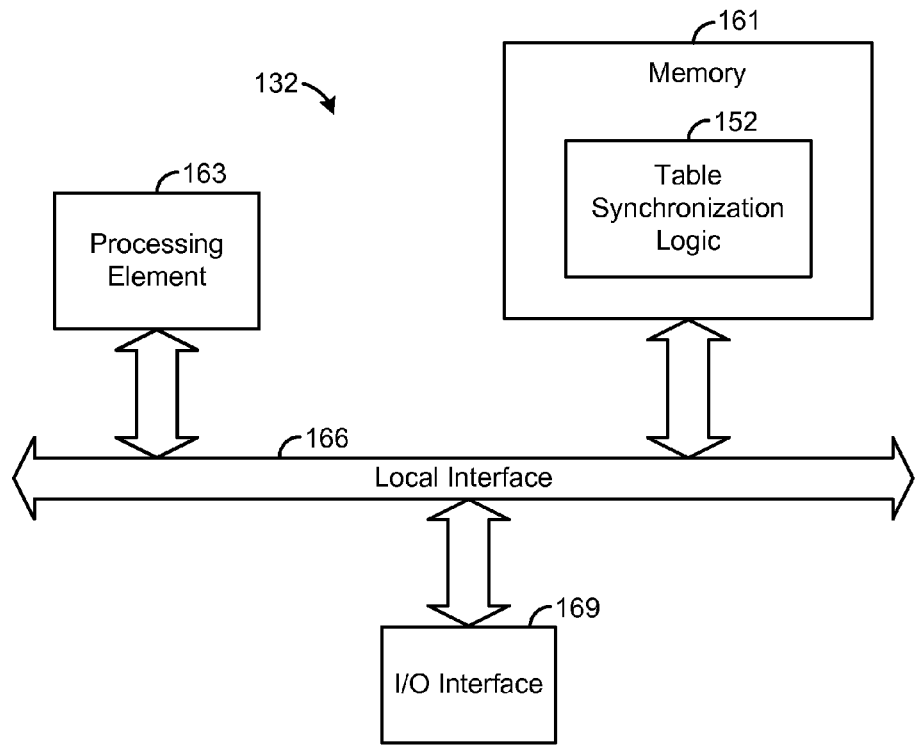
FIG. 5 is a block diagram illustrating an exemplary embodiment of a processor, such as is depicted by FIG. 4.

However, each processor 132-134 stores and implements table synchronization logic 152-154, respectively, that are configured to synchronize forwarding tables (e.g., the MAC tables 42-44) differently than the conventional switches 12-14, as will be described in more detail hereafter. As shown by FIG. 5, the table synchronization logic 152 is preferably implemented in software and stored within memory 161 of the processor 132. In other embodiments, it is possible for the table synchronization logic 152 to be implemented in hardware, software, firmware or any combination thereof.

Note that table synchronization logic 152, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary processor 132 depicted by FIG. 5 comprises at least one conventional processing element 163, such as a central processing unit (CPU), that communicates to and drives the other elements within the processor 132 via a local interface 166, which can include at least one bus. Further, an input/output (I/O) interface 169 may be coupled to other components of the switch 112, such as the exceptions queue 75, classifying and parsing element 65, and table management logic 88 depicted by FIG. 4 for exchanging data with these other switch components.

For simplicity of illustration, the exemplary stack 117 shown by FIG. 3 has three switches 112-114 connected in series. In other embodiments, other numbers of switches are possible, and other connection arrangements are possible. Further, any switch of the stack 117 may be coupled to any number of other switches.

When one of the switches 112-114 receives a data packet having an unknown source MAC address, the switch is configured to learn the source MAC address by updating its MAC table to include such address, as described above for the conventional switches 12-14. Such switch is also configured to disseminate the new MAC address to the other switches of the stack 117 so that the MAC tables of the stack 117 can be synchronized in view of the new MAC address. Thus, each MAC table 42-44 should be updated to learn the same MAC addresses. However, unlike the conventional switches 12-14, the switch 112-114 that initially receives the unknown source MAC address transmits a message, referred to hereafter as a "synchronization message," that causes the downstream switches of the stack 117 to learn such address in hardware. In this regard, the receiving switch controls the fields of the synchronization message in order to spoof the downstream switches into determining that the synchronization message was received via the same port from which the unknown source MAC address was received even though, in actuality, the synchronization message is generated by the table synchronization logic of the receiving switch. Thus, the downstream switches handle the synchronization message as if it is a packet received from an external source (e.g., the network 18), thereby causing the switches to learn the unknown source MAC address in hardware, as will be described in more detail hereafter.

Figure 6:
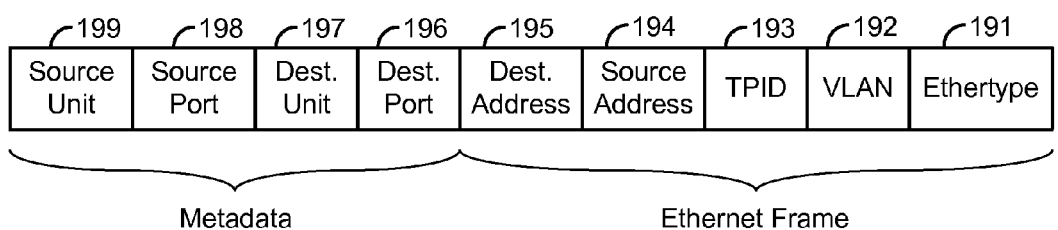
FIG. 6 is a block diagram illustrating an exemplary frame format for messages communicated in a stack of network switches, such as depicted by FIG. 4.

Note that there are various types of frame formats that may be used for the synchronization message in order to achieve the foregoing. FIG. 6 depicts an exemplary frame format for the synchronization message, noting that this format is common to other types of messages communicated within the stack 117, such as unicast, broadcast, and multicast messages, though it is possible for any packet to include additional fields (e.g., payload) not shown by FIG. 6. The frame format is compatible with Ethernet protocols, but other protocols are possible.

As shown by FIG. 6, the exemplary frame format defines a plurality of fields 191-199. As will be described in more detail hereafter, the fields 191-195 define an Ethernet frame according to applicable Ethernet standards, and the fields 196-199 include metadata that is appended to the Ethernet frame. In this regard, it is common for switches within a stack to append vendor-specific metadata fields 196-199 to messages that are communicated in the stack. Such fields 196-199 allow for the communication of metadata that can assist in management, control, and operation of the switches in the stack. Such fields 196-199 are stripped from the Ethernet frame before it is transmitted out of the stack so that an Ethernet frame on egress from the stack is the same as the Ethernet frame on ingress to the stack.

According to the frame format shown by FIG. 6, an Ethertype field 191 provides information about the type and format of the message according to Ethernet protocols. If the packet includes a VLAN tag, such tag or tags are inserted into a VLAN field 192. A tag protocol identifier (TPID) field 193 is used to indicate whether the packet includes a VLAN tag and, if so, the format of the VLAN field 192. A source address field 194 is for carrying the packet's source MAC address for the packet, and a destination address field 195 is for carrying the packet's destination MAC address.

Note that each port within the stack 117 is uniquely identified by a port identifier, referred to hereafter as "global port identifier," that includes (1) a unit identifier that identifies the switch 112-114 in which the port resides relative to the other switches of the stack 117 and (2) a local port identifier that identifies the port relative to the other ports of the same switch (which is identified by the unit identifier). The fields 196 and 197 are used to indicate the packet's destination port within the stack 117, such as when the packet defines a unicast message. In this regard, a destination port field 196 is used to carry the local port identifier of the destination port, and a destination unit field 197 is used to carry the unit identifier that identifies the switch 112-114 to which the packet is to be transmitted. Also, the fields 198 and 199 are used to indicate the packet's source port within the stack 117 (i.e., the port that received the packet on ingress to the stack 117). In this regard, a source port field 198 is used to carry the local port identifier of the source port, and a source unit field 199 is used to carry the unit identifier that identifies the switch 112-114 that received the packet on ingress to the stack 117.

Figure 4:
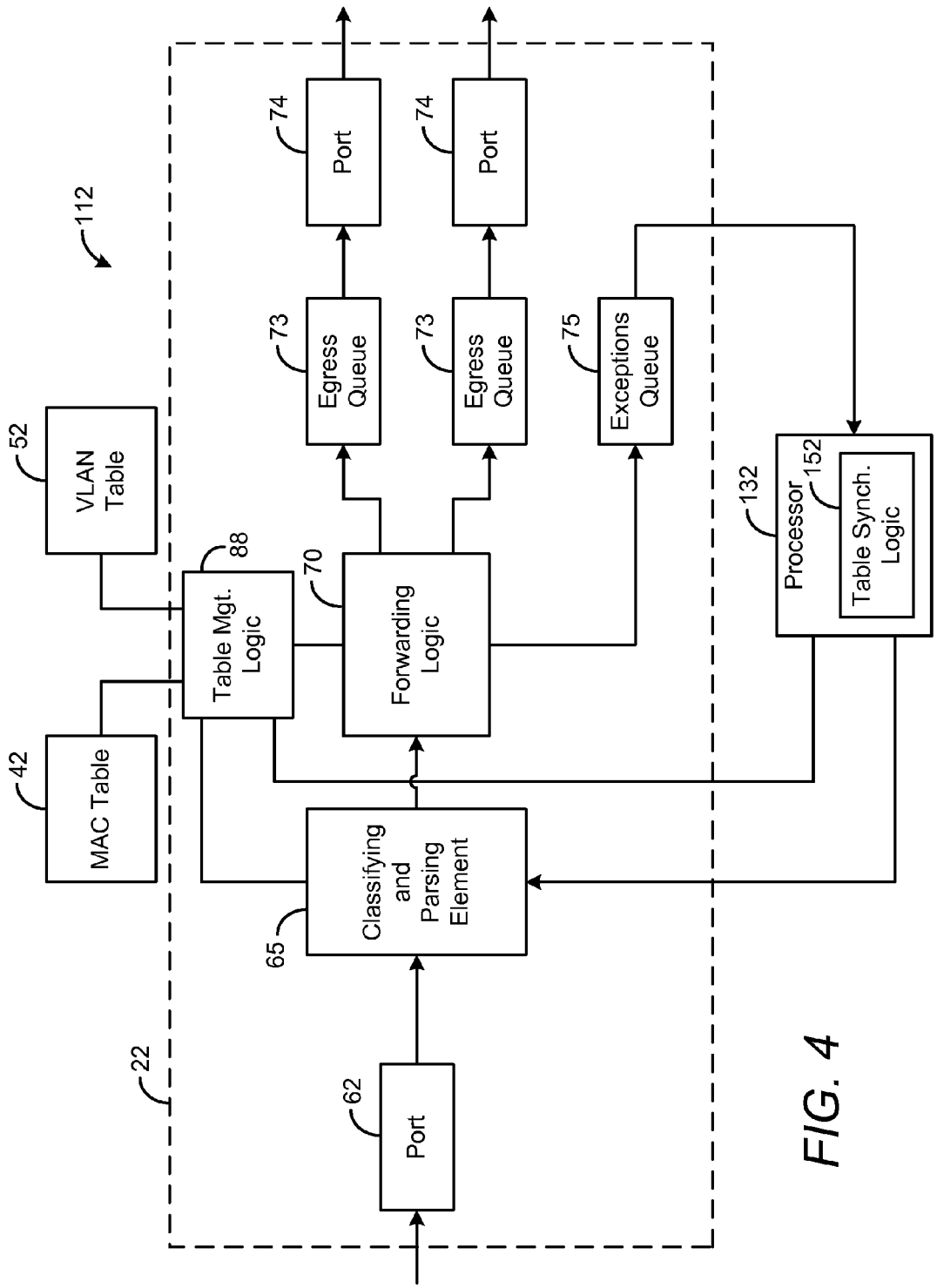
FIG. 4 is a block diagram illustrating an exemplary embodiment of a network switch, such as is depicted by FIG. 3.

For illustrative purposes, assume that the switch 112 receives a data packet from the network 18 via the port 62 shown by FIG. 4. Also assume that the source MAC address of the packet is unknown in that it is not currently stored in the MAC tables 42-44.

Figure 7:
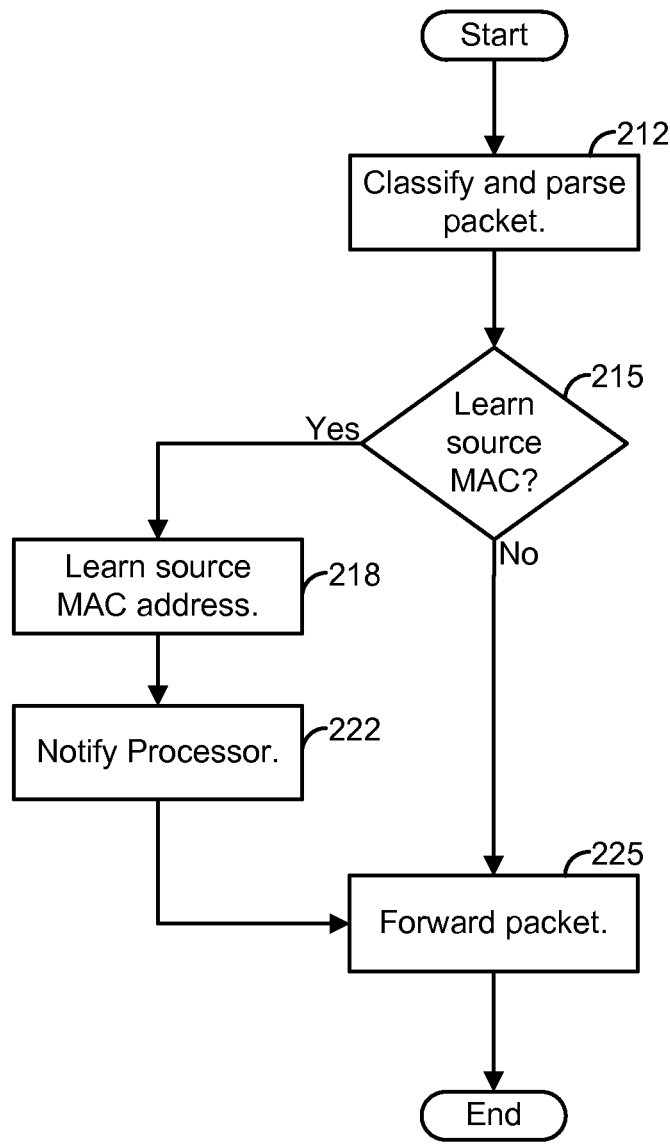
FIG. 7 is a flowchart illustrating an exemplary method of processing a packet in a network switch, such as is depicted by FIG. 4.

When the packet is received by the switch 112, the classifying and parsing element 65 is configured to classify and parse the packet, as shown by block 212 of FIG. 7. The element 65 provides the source MAC address to the table management logic 88, which determines whether there is a MAC-table miss for this source MAC address, and, hence, whether to learn such source MAC address, as shown by block 215 of FIG. 7. Specifically, the table management logic 88 determines whether there is an entry of the MAC table that stores the source MAC address of the packet and, if the packet has a VLAN tag, the packet's VLAN tag. In the instant example, the source MAC address is not stored in the MAC table 42, and the table management logic 88, therefore, updates the MAC table 42 in order to learn the source MAC address, as shown by block 218 of FIG. 7. In particular, the table management logic 88 is configured to insert the packet's source MAC address into an available entry of the MAC table 42 along with the global port identifier of the port 62 and any VLAN tag that is included in the data packet. The table management logic 88 is configured to then notify the processor 132 of the learning event, as shown by block 222 of FIG. 7. In this regard, the table management logic 88 transmits a notification that includes the packet's metadata, including at least the source MAC address, global port identifier, and VLAN tags (if any). As shown by block 225 of FIG. 7, the packet is forwarded by the forwarding logic 70 after processing by the classifying and parsing element 65.

When the table management logic 88 notifies the processor 132 of the learning event in block 222, the processor 132 invokes the table synchronization logic 152 so that a table synchronization operation for synchronizing the MAC tables 42-44 is initiated, as will be described in more detail below. In this regard, the table synchronization logic 152 is configured to use the packet's metadata in order to define a new synchronization message according to the frame format shown by FIG. 6. In particular, the table synchronization logic 152 inserts the source MAC address of the packet into the source address field 194. If the packet includes a VLAN tag, the synchronization logic 152 inserts such VLAN tag or tags into the VLAN field 192 and appropriately sets the TPID field 193 based on such VLAN tag or tags.

The synchronization logic 152 also controls the destination address field 195 to indicate that the synchronization message is a private multicast packet for the switches of the stack 117. Notably, the switches 112-114 are provisioned such that each switch 112-114 of the stack 117 is a member of the identified multicast group. Thus, based on the destination address field 195, the switches 112-114 of the stack 117 are configured to forward the synchronization message to one another without causing such message to egress from the stack 117. Therefore, each downstream switch 113 and 114 should ultimately receive the synchronization message.

In addition, using the metadata received from the table management logic 88, the table synchronization logic 152 inserts the local port identifier of the port 62 into the source port field 198, and the synchronization logic 152 inserts into the source unit field 199 the unit identifier of the switch 112 that received the trapped packet on ingress to the stack 117. Insertion of such information into the fields 198 and 199 has the effect of spoofing downstream switches 113 and 114 into determining that the synchronization message has been received via the identified port 62 on ingress to the stack 117 even though the synchronization message actually originates from the table synchronization logic 152 and, specifically, is not received by the identified port 62.

In the instant example, the destination unit field 197 and the destination port field 196 are not used for the purposes of the table synchronization operation being described. The table synchronization logic 152 may fill these fields 196 and 197 with any data (e.g., dummy data) or allow these fields to be filled by the switch logic 22.

After forming the synchronization message, the table synchronization logic 152 transmits the message to the classifying and parsing element 65, which inserts the message into the normal packet flow passing through the switch 112, and the synchronization message is processed according to FIG. 7. Note that the source MAC address in the field 194 has now been learned by the switch 112, and there should not be a miss of the MAC table 42 for this source MAC address. Thus, the synchronization message does not trigger a new learning event for the source MAC address in the switch 112. The forwarding logic 70 forwards the synchronization message based on the destination address field 195 to at least one port 74 that is coupled to the switch 113 so that the synchronization message is received by the switch 113.

Upon receiving the synchronization message, the switch logic 23 processes the packet according to FIG. 7. Thus, the switch logic 23 detects a miss of the MAC table 43 for the message's source MAC address in the field 194 and, in response, learns such source MAC address. Specifically, the switch logic 23 inserts such source MAC address into an available entry of the MAC table 43 along with the VLAN tag or tags in the VLAN field 192, if any, and the global port identifier of the port 62 in the switch 112 that originally received the source MAC address on ingress to the stack 117. Notably, this learning of the source MAC address occurs in hardware without requiring input from software or firmware executed by the processor 133, although the processor 133 may be notified of the learning event, as described above for the switch 112. As used herein, a "hardware learn" refers to a process of a switch learning an address in hardware in response to a packet carrying the address without requiring, waiting on, or relying on input from software or firmware within the switch. While the processor 133 may be notified of the aforementioned hardware learn and ultimately take actions based on the hardware learn, the switch logic 23 may automatically perform the hardware learn in response to the synchronization message without any involvement or input from the processor 133 or the table synchronization logic 153.

In the instant example, the synchronization message is forwarded by the switch logic 23 based on its destination address field 195, which as described above indicates the message to be a multicast packet for a private multicast group that includes all of the switches 112-114 of the stack 117. Accordingly, the synchronization message is forwarded to the switch 114, which uses the same techniques described above for the switch 113 in order to learn the source MAC address of the synchronization message. Notably, as with the switch 113, the switch logic 24 of the switch 114 automatically learns such source MAC address in hardware without waiting on input from software or firmware in the switch 114. While the processor 134 may be notified of the MAC learning invent, the switch logic 24 may automatically perform a hardware learn of the source MAC address without any involvement or input from the processor 134 or the table synchronization logic 154.

Since the dissemination of the unknown source MAC address occurs in hardware without having to wait on processing by the software in processors 133 and 134, the MAC tables 43 and 44 of the switches 113 and 114 are quickly synchronized with the MAC table 42. That is, the MAC tables 43 and 44 of the switches 113 and 114 are quickly updated to learn the unknown source MAC address originally learned by the MAC table 42 of the switch 112.

It should be noted that the synchronization logic 153 and 154 of the switches 113 and 114 are configured to generate synchronization messages in response to packets containing unknown source MAC addresses received by the switches 113 and 114, respectively, on ingress to the stack 117 according to the same techniques described above for the switch 112. Thus, regardless of which switch 112-114 receives an unknown source MAC address on ingress to the stack 117, all of the MAC tables 42-44 should be updated to learn such source MAC address.

In addition, it should also be noted that the conventional switch logic 22-24 are configured to invalidate entries of the MAC tables 42-44 based on the ages of such entries. For example, referring to FIG. 4, the table management logic 88 is configured to track the ages of the entries of the MAC table 42. When the age of an entry of the MAC table 42 exceeds a predefined threshold (e.g., when a timeout period for the entry expires), the table management logic 88 is configured to invalidate the entry so that it may be overwritten by a mapping for a new MAC address. This process generally purges stale MAC addresses from the MAC table 42 to provide availability for learning new MAC addresses. The other switch logic 23 and 24 are similarly configured to invalidate MAC table entries based on ages of entries in MAC tables 43 and 44, respectively.

However, such purging of the MAC tables 42-44 can result in inconsistencies between the MAC tables 42-44 unless steps are taken to ensure synchronization. In this regard, one switch 112-114 may purge a particular MAC address from its MAC table at a different time or based on a different timeout period relative to another switch such that all of the MAC tables 42-44 no longer have the same mappings due to the purge.

In one exemplary embodiment, the synchronization logic 152-154 are configured to synchronize purges of the MAC tables 42-44 in order to help keep the entries of the MAC tables 42-44 consistent from switch-to-switch. In one exemplary embodiment, the synchronization logic 152-154 achieve the foregoing by disabling certain MAC-table purges based on whether the entry to be purged is correlated with a local port. As an example, the synchronization logic 152 is configured to disable purges of the MAC table 42 that are based on a local timeout unless the entry to be purged includes a global port identifier that identifies a port of the switch 112. Similarly, the synchronization logic 153 is configured to disable purges of the MAC table 43 that are based on a local timeout unless the entry to be purged includes a global port identifier that identifies a port of the switch 113, and the synchronization logic 154 is configured to disable purges of the MAC table 44 that are based on a local time out unless the entry to be purged includes a global port identifier that identifies a port of the switch 114.

Note that there are various techniques that may be used to disable purges, as described above. As an example, referring to FIG. 4, when the table management logic 88 determines that an entry of the MAC table 42 is to be purged based on a local timeout for that entry, the table management logic 88 is configured to notify the processor 132, which invokes the table synchronization logic 152. The table synchronization logic 152 is then configured to communicate with the table management logic 88 in order to disable such purge unless the entry to be purged maps a MAC address to a local port 62 or 74 of the switch 112.

Note that in some switch architectures, the table management logic 88 may be configured to invalidate an entry of a MAC table without waiting on approval or confirmation from the processor 132. In such case, a purge of the MAC table 42 can be effectively disabled by instructing the table management logic 88 to write the entry to the MAC table 42 thereby starting a new timeout period. Thus, even if the original entry is invalidated, a new entry having the same information is written, and this new entry remains after the original entry is invalidated. In other embodiments, other techniques for disabling MAC-table purges may be used. In any event, the only entries that synchronization logic 152 permits the table management logic 88 to actually purge based on local timeouts are entries that map a MAC address to a local port 62 or 74 of the switch 112.

When the table synchronization logic 152 permits the table management logic 88 to purge an entry of the MAC table 42 based on a local timeout, the synchronization logic 152 disseminates the MAC address of the purged entry to the other switches 113 and 114 so that these switches 113 and 114 may also purge the same mapping in order to keep the MAC tables 42-44 synchronized. In one exemplary embodiment, the MAC address of the purged entry is disseminated via a message, referred to herein as a "purge message," which has the same format shown by FIG. 6, although other formats are possible in other embodiments.

In this regard, the synchronization logic 152 is configured to insert the MAC address of the purged entry into the source address field 194. In addition, if the purged entry has any VLAN tags, the synchronization logic 152 is configured to insert such tag or tags into the VLAN field 192 and to appropriately control the TPID field 193 based on the VLAN tag or tags inserted into the VLAN field 192. The synchronization logic 152 is further configured to control the destination address field 195 to indicate that the packet is a multicast packet for a private multicast group for which all of the switches 112-114 of the stack 117 are members, as described above for the synchronization message. However, rather than putting the unit identifier and port identifier of the purged entry into the source unit field 199 and the source port field 198, respectively, the synchronization logic 152 instead inserts specialized codes that are recognizable to the synchronization logic 153 and 154 of the other switches 113 and 114. That is, based on the codes in the source unit field 199 and the source port field 198, each set of synchronization logic 153 and 154 recognizes the purge message as a command to purge the MAC-table entry that maps the MAC address of the source address field 194 and the VLAN tags of the VLAN field 192.

When the switch logic 23 of the switch 113 receives the purge message, it is configured to recognize the message as a station move and, thus, notify the processor 133. In this regard, the switch logic 23 is configured to search the MAC table 43 for an entry that has (1) the MAC address matching the MAC address in the source address field 194 and (2) VLAN tag or tags matching the VLAN tag or tags, if any, in the VLAN field 192. Upon finding such entry, the switch logic 23 compares the port identifier and unit identifier of such MAC-table entry to the codes in the source port field 198 and source unit field 199, respectively, of the purge message. Since these fields 198 and 199 include predefined codes, they should not match the unit identifier and port identifier in the identified entry of the MAC table. The switch logic 23 is configured to interpret such a discrepancy as a station move where the source of the MAC address has been moved to a new station. In response, the table management logic 88 is configured to notify the processor 132 of the detected station move. In this regard, the table management logic 88 transmits a notification that includes the packet's metadata (e.g., data of the fields 192, 194, 198, and 199), and the processor 133 invokes the table synchronization logic 153 in response to such notification.

As noted above, based on the codes in the fields 198 and 199, the table synchronization logic 153 is configured to interpret the purge message as a command to purge the identified MAC-table entry, not as a notification of a station move. Thus, the synchronization logic 153 is configured to instruct the switch logic 23 to invalidate the entry of the MAC table 43 that is correlated with the MAC address of the source address field 194 and the VLAN tag or tags, if any, of the VLAN field 192. In response, the switch logic 23 is configured to invalidate such entry thereby purging the same MAC-address mapping that was originally purged by the switch 112.

The switch logic 23 is configured to forward the purge message to the other switch 114 of the stack 117. This other switch 114 is configured to purge the same MAC address mapping from the MAC table 44 according to the techniques described above for the switch 113. Thus, in response to a timeout of an entry in the MAC table 42, all of the MAC tables 42-44 are purged of the mapping defined by such entry. Note that each set of synchronization logic 152-154 is configured to similarly generate a purge message when it receives a notice that the MAC-table entry correlated with a local port has been purged from its MAC table. Thus, over time, stale MAC-table entries are allowed to expire while synchronization of the MAC tables 42-44 is maintained.

It should be noted that existing switches can be modified to implement the table synchronization techniques described herein simply by updating software or firmware (e.g., adding table synchronization logic in software or firmware). That is, the embodiments of the table synchronization logic described herein are compatible with existing switch architectures such that existing switches can be easily modified through software or firmware updates without having to change the hardware configurations of the switches.

In addition, in several exemplary embodiments described above, table synchronization techniques are described in the context of maintaining synchronization among MAC tables. The table synchronization techniques described herein may be used to maintain synchronization among other types of tables, if desired.

Now, therefore, the following is claimed:

1. A switch stack for forwarding network traffic, comprising:
   a first switch having first logic and a processor, the first logic having a plurality of ports and configured to forward data packets based on a first forwarding table of the first switch, wherein the first logic is configured to learn a source address of a data packet received from a network via one of the ports on ingress to the stack, wherein the first logic is configured to learn the source address by storing the source address in the first forwarding table and correlating, in the first forwarding table, the source address with a port identifier that identifies the one port, wherein the processor is configured to form and transmit a synchronization message having the source address in response to the data packet received from the network; and
   a second switch having second logic implemented in hardware, the second logic having a plurality of ports and configured to forward data packets based on a second forwarding table of the second switch,
   wherein the processor is configured to insert the port identifier into at least one field of the synchronization message such that the second logic is spoofed into determining that the synchronization message has been received by the one port of the first switch thereby causing the second logic to perform a hardware learn of the source address in response to the synchronization message, and wherein the second logic is configured to perform the hardware learn by storing the source address in the second forwarding table and correlating the source address with the port identifier in the second forwarding table.

2. The stack of claim 1, wherein the synchronization message is a multicast message for a private multicast group, and wherein each switch of the stack is a member of the private multicast group.

3. The stack of claim 1, wherein the second logic is configured to forward the synchronization message to a third switch of the stack without trapping the synchronization message.

4. The stack of claim 1, wherein the processor is configured to disable purges of the first forwarding table based on port identifiers correlated with addresses stored in the first forwarding table.

5. A switch stack for forwarding network traffic, comprising:
   a first switch having first logic and a processor, the first logic having a plurality of ports and configured to forward data packets based on a first forwarding table of the first switch, wherein the first logic is configured to learn a source address of a data packet received from a network via one of the ports on ingress to the stack, wherein the first logic is configured to learn the source address by storing the source address in the first forwarding table and correlating the source address with a port identifier that identifies the one port, wherein the processor is configured to form and transmit a synchronization message having the source address in response to the data packet received from the network; and
   a second switch having second logic implemented in hardware, the second logic having a plurality of ports and configured to forward data packets based on a second forwarding table of the second switch,
   wherein the processor is configured to insert the port identifier into at least one field of the synchronization message such that the second logic is spoofed into determining that the synchronization message has been received by the one port of the first switch thereby causing the second logic to learn the source address in response to the synchronization message, wherein the second logic is configured to learn the source address by storing the source address in the second forwarding table and correlating the source address with the port identifier, wherein the processor is configured to form a purge message having the source address in response to purging of the source address from the first forwarding table, wherein the processor is configured to transmit the purge message to the second switch, wherein the processor is configured to control the purge message in order to spoof the second logic into determining that the purge message is related to a station move thereby causing the second logic to notify a processor of the second switch regarding the purge message, and wherein the processor of the second switch is configured to initiate a purge of the source address from the second forwarding table in response to the purge message.

6. A communication system, comprising:
a network; and
a switch stack coupled to the network, the stack having a first switch and a second switch, wherein the first switch is configured to receive a data packet via a port of the first switch, the data packet having a source address, wherein the first switch is configured to learn the source address by adding the source address to a forwarding table of the first switch and correlating, in the forwarding table of the first switch, the source address with a port identifier identifying the port of the first switch, wherein the first switch is responsive to the data packet for transmitting a synchronization message for synchronizing forwarding tables of the stack based on the source address, wherein the first switch is configured to insert the source address into the synchronization message and to control metadata of the synchronization message in order to spoof the second switch into determining that the synchronization message has been received via the port of the first switch, and wherein the second switch is configured to perform a hardware learn in response to the synchronization message by adding the source address to a forwarding table of the second switch and correlating the source address with the port identifier in the forwarding table of the second switch.

7. The system of claim 6, wherein the first switch has a processor that is configured to form the synchronization message in response to learning of the source address by the first switch.

8. The system of claim 6, wherein the synchronization message is a multicast message for a private multicast group, and wherein each switch of the stack is a member of the private multicast group.

9. The system of claim 6, wherein the second switch is configured to forward the synchronization message to a third switch of the stack without trapping the synchronization message.

10. The system of claim 6, wherein the first switch is configured to determine whether to purge the source address from the forwarding table of the first switch based on the port identifier.

11. A communication system, comprising:
a network; and
a switch stack coupled to the network, the stack having a first switch and a second switch, wherein the first switch is configured to receive a data packet via a port of the first switch, the data packet having a source address, wherein the first switch is configured to learn the source address by adding the source address to a forwarding table of the first switch, wherein the first switch is responsive to the data packet for transmitting a synchronization message for synchronizing forwarding tables of the stack based on the source address, wherein the first switch is configured to insert the source address into the synchronization message and to control metadata of the synchronization message in order to spoof the second switch into determining that the synchronization message has been received via the port of the first switch, and wherein the second switch is configured to perform a learn of the source address in hardware in response to the synchronization message by adding the source address to a forwarding table of the second switch, wherein the first switch is responsive to purging of the source address from the forwarding table of the first switch for transmitting a purge message, wherein the first switch is configured to insert the source address into the purge message and to control metadata of the purge message in order to spoof the second switch into determining that the purge message is related to a station move, and wherein the second switch is configured to purge the source address from the forwarding table of the second switch in response to the purge message.

12. The system of claim 6, wherein the metadata comprises a port identifier of the port.

13. The system of claim 12, wherein the second switch is configured to correlate the port identifier with the source address in the forwarding table of the second switch.

14. A communication method, comprising:
receiving a data packet from a network via a port of a first switch within a switch stack, wherein the data packet has a source address;
determining, in response to the data packet, whether a forwarding table of the first switch has a mapping corresponding to the source address;
learning the source address in the first switch based on the determining, the learning comprising adding the source address to the forwarding table of the first switch and correlating, in the forwarding table of the first switch, the source address with a port identifier identifying the port of the first switch;
transmitting a synchronization message from the first switch based on the determining, wherein the synchronization message has the source address;
receiving the synchronization message at a second switch of the stack;
controlling metadata of the synchronization message at the first switch to indicate to the second switch that the synchronization message has been received by the port; and
performing a hardware learn of the source address at the second switch in response to the synchronization message and based on the metadata, wherein the performing the hardware learn comprises adding the source address to a forwarding table of the second switch and correlating the source address with the port identifier in the forwarding table of the second switch.

15. The method of claim 14, wherein the synchronization message is a multicast message for a private multicast group, and wherein each switch of the stack is a member of the private multicast group.

16. The method of claim 14, further comprising forwarding the synchronization message from the second switch to a third switch of the stack without trapping the synchronization message at the second switch.

17. The method of claim 14, further comprising determining whether to purge the source address from the forwarding table of the first switch based on a port identifier correlated with the source address in the forwarding table of the first switch.

18. A communication method, comprising:
receiving a data packet from a network via a port of a first switch within a switch stack, wherein the data packet has a source address;
determining, in response to the data packet, whether a forwarding table of the first switch has a mapping corresponding to the source address;
learning the source address in the first switch based on the determining, the learning comprising adding the source address to the forwarding table of the first switch;
transmitting a synchronization message from the first switch based on the determining, wherein the synchronization message has the source address;
receiving the synchronization message at a second switch of the stack;
controlling metadata of the synchronization message at the first switch to indicate to the second switch that the synchronization message has been received by the port;
performing a learn of the source address in hardware at the second switch in response to the synchronization message and based on the metadata, wherein the performing the learn comprises adding the source address to a forwarding table of the second switch purging the source address from the forwarding table of the first switch;
transmitting a purge message from the first switch in response to the purging;
receiving the purge message at the second switch;
controlling metadata of the purge message at the first switch to indicate to the second switch that the purge message is related to a station move; and
purging the source address from the forwarding table of the second switch in response to the purge message.

19. The method of claim 14, wherein the controlling comprises inserting a port identifier of the port into a field of the metadata.

20. The method of claim 19, further comprising correlating the port identifier with the source address in the forwarding table of the second switch.

21. The stack of claim 1, wherein the second switch is configured to receive a data packet via one of the plurality of ports of the second switch, wherein the data packet received by the second switch has a destination address corresponding to the source address stored in the second forwarding table, and wherein the second logic is configured to forward the data packet received by the second switch to the first switch based on a correlation between the source address and the port identifier in the second forwarding table.

* * * * *